United States Patent [19]

McGregor

[11] Patent Number: 4,944,334

[45] Date of Patent: Jul. 31, 1990

[54] VIBRATING HOPPER AND AUGER FEED ASSEMBLY

[76] Inventor: Harold R. McGregor, 1444 Lincoln Ave., Owatonna, Minn. 55060

[21] Appl. No.: 270,845

[22] Filed: Nov. 14, 1988

[51] Int. Cl.⁵ .......................... B65B 1/08; B65B 1/12; B65B 1/20
[52] U.S. Cl. ....................... 141/71; 141/59; 141/73; 141/74; 141/76; 141/77; 141/79; 141/80; 100/145
[58] Field of Search ................. 141/59, 67, 68, 69, 141/71, 72, 73, 74, 75, 76, 77, 78, 79, 80, 83, 114, 128, 256, 257, 275, 276, 10, 12; 366/341, 111, 114; 100/145

[56] References Cited

U.S. PATENT DOCUMENTS

| | | | |
|---|---|---|---|
| 2,114,104 | 4/1938 | Driscoll et al. | 141/73 |
| 2,589,583 | 3/1952 | Thompson | 141/73 |
| 3,664,385 | 5/1972 | Carter | 141/12 |
| 3,795,386 | 3/1974 | Carter et al. | 100/145 |
| 3,862,594 | 1/1975 | Stolting et al. | 100/145 X |
| 4,185,669 | 1/1980 | Jevakohoff | 141/59 |
| 4,211,163 | 7/1980 | Brown et al. | 100/145 |

FOREIGN PATENT DOCUMENTS 2906314  8/1979  Fed. Rep. of Germany ........ 141/71
2924313 12/1980  Fed. Rep. of Germany ........ 141/80

Primary Examiner—Ernest G. Cusick
Attorney, Agent, or Firm—Moore & Hansen

[57] ABSTRACT

A vibrating hopper and auger feed assembly including an infeed auger which transfers product from a main storage bin to a live bottom hopper, the live bottom hopper having a vibrating bottom pan and discharge spout, an inverted pressure cone which is centrally vented to the exterior of the hopper, and a central vertical feed auger which extends through the inverted pressure cone and the discharge spout. A transverse cross auger transfers product from the live bottom hopper to a bottom fill auger assembly for filling bags carried on a bag elevator. Each of four augers in the assembly sequentially compresses and deaerates the product, the backpressure being vented to the exterior of the assembly, to achieve a very uniform product density within the fill tube and dispensing spout. The operation of the infeed auger may be controlled by the level of product within the live bottom hopper, and the bottom fill auger revolution rate may similarly be interlocked with other functions of the assembly, particularly the raising and lowering of the bag elevator. Conventional bag hanging and handling devices may be utilized, or the assembly may be customized to a particular application.

20 Claims, 2 Drawing Sheets

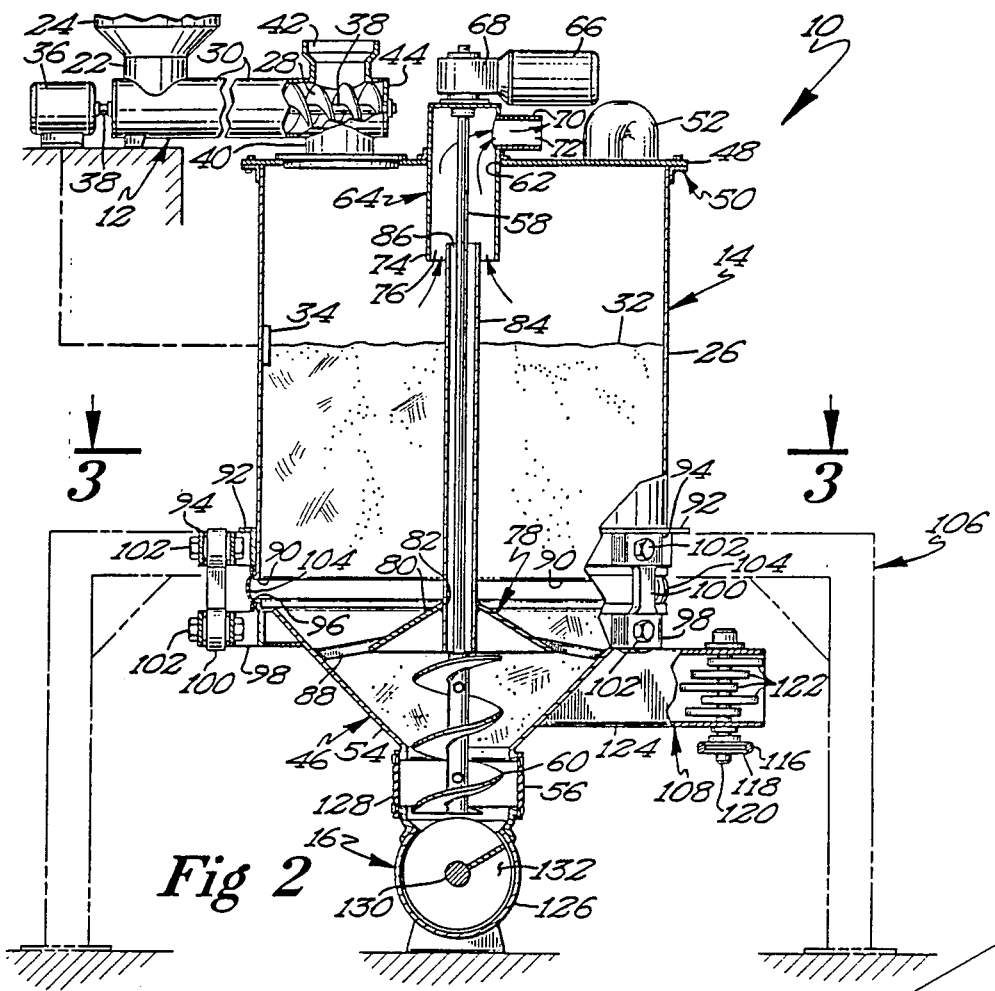
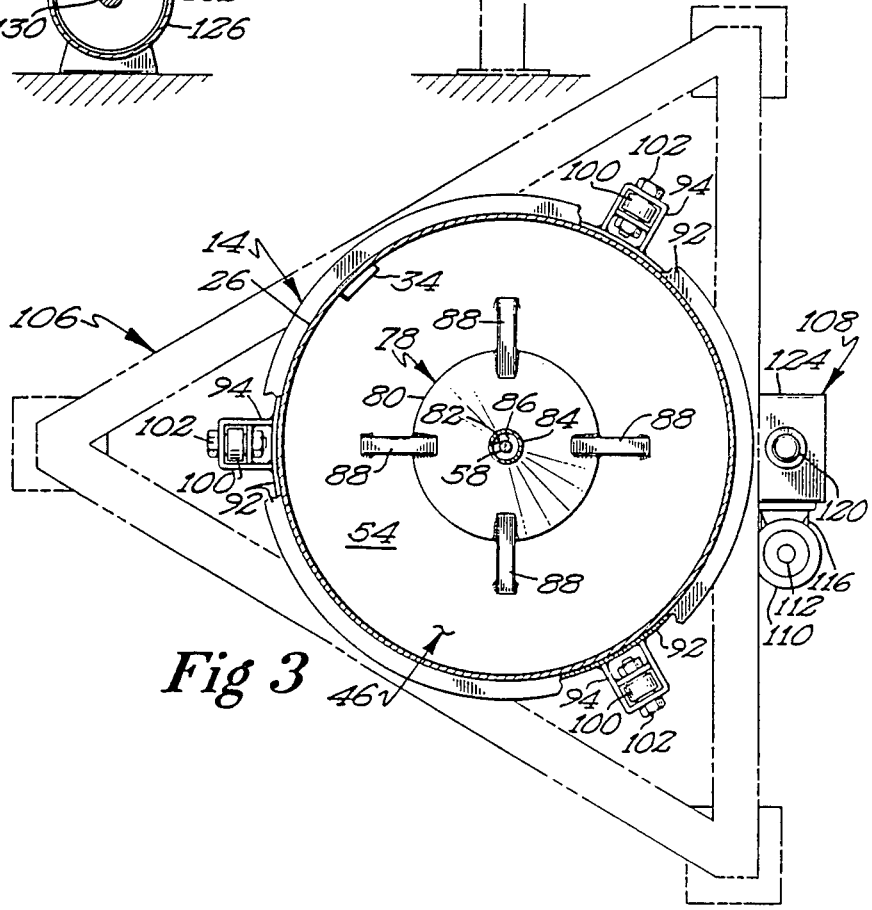

VIBRATING HOPPER AND AUGER FEED ASSEMBLY

BACKGROUND OF THE INVENTION

This invention relates generally to a mechanism for conveying and de-aerating a finely powdered product, and particularly to a vibrating hopper having an inverted vented pressure cone with a central compressing auger, used in combination with an infeed auger and a transverse conveying auger which similarly de-aerate and compress the product.

Vibrational movement has been utilized for many material handling operations, including conveying articles as shown in U.S. Pat. No. 4,398,612; reorienting or disengaging irregularly shaped objects as shown in U.S. Pat. No. 4,462,508; discharging or dispensing particulate matter as shown in U.S. Pat. No. 4,530,431; and sifting or separating products as shown in U.S. Pat. No. 3,528,386. Vibrational movement is also known to de-aerate and settle both particulate and granular matter, the degree of de-aeration and settling depending in varying proportions on the intensity and direction of the vibration, the duration of the vibration, and the physical and chemical properties of particulate or granular matter itself. Some products may also be de-aerated by compression, such as in a screw feed auger.

Various rotary feed auger systems for dispensing particulate matter into containers are known. U.S. Pat. No. 4,582,097 to Ixxi discloses a device for top filling containers on a conveyor belt, the hopper having a vertically disposed central auger wherein successive auger revolution rates are determined by measuring the weight of the product previously delivered to a container and computing the ratio of auger revolutions to product weight, and then adjusting the auger revolution rate and time according to that ratio to deliver the desired weight of product to the subsequent container. The Ixxi '097 patent also discloses measuring the number of auger revolutions after the auger is disengaged until it brakes completely to calculate a wind-down number which is subtracted from the number of revolutions needed to obtain a desired fill weight. The accuracy of such a system is limited by the degree of consistency in the density of the product which can be achieved and maintained as the auger is repeatedly engaged and disengaged. While such a system can be useful in two-stage bulk and top fill applications where the initial bulk filling by weight requires only moderate precision, it has not proven suitable for two stage filling where product is topped directly from the dispensing spout (such as in a vertical bottom fill auger) or where high precision is required.

Vertical rotary feed augers of the type described above have relatively short compression paths, thereby placing an upper limit on the maximum density that can be achieved with certain powered products. While some products will become fluid or lose their inherent physical properties at too great a compression, or will bind and seize within an auger tube, other products are capable of withstanding tremendous compression and in some cases will flow better under these conditions. In these cases, where optimal density is limited by the physical properties and tolerances of the particular material, the length of the compression path through the auger tube may be too short, or the necessary revolution rate of the auger too slow, to achieve optimal compression. Conversely, increasing the auger speed may then limit the accuracy of the device, particularly due to the agitation created when the auger is started.

U.S. Pat. No. 4,629,328 to Revelt discloses a gravity blending apparatus having an inverted cone within a stationary hopper, the cone being vented to a position above the product level within the hopper. Other vented and unvented pressure cones within material handling hoppers were previously known, representative examples being shown in U.S. Pat. Nos. 4,553,849, and 4,473,300 to Goins; 4,285,602 to Hagerty; and 3,936,037 to Leonard. These inverted pressure cones permit accelerated gravity blending and promote uniformity in product density, with the vented cones assisting in the release of air backpressure to enhance the settling of the product as it accumulates in the bottom of the hopper and flows through the discharge spout, but they similarly would interfere with the use of a vertical rotary feed auger. Used alone or in combination with the rotary feed augers described above, the gravity blending devices having inverted pressure cones as shown above will not permit continuous compression of the product to a uniform and controllable density.

BRIEF SUMMARY OF THE INVENTION

It is therefore one object of this invention to design an assembly for conveying finely powdered or particulate matter from a storage bin to a bag filling and handling station, and in the process to maximize the compression and de-aeration of the product in order to create a very uniform product density at the dispensing spout.

It is an additional object of this invention to design the above assembly such that this uniform density may be utilized in bulk filling and topping by weight or volume wherein the amount of in-flight product between the dispensing spout and bag is calculated directly with great precision, and is applied to the calculation for current bag contents rather than for the projected weight or contents of a subsequent bag.

It is yet another object of this invention to design the above assembly such that very high product density can be achieved by compression of the product within a series of augers, the optimal density achieved being limited by the physical characteristics of the material rather than the length or speed of the auger in the bottom fill apparatus.

Briefly described, the vibrating hopper and auger feed assembly of this invention includes an infeed auger which transfers product from a main storage bin to a live bottom hopper, the live bottom hopper having a vibrating bottom pan and discharge spout, an inverted pressure cone which is centrally vented to the exterior of the hopper, and a central vertical feed auger which extends through the inverted pressure cone and the discharge spout. A transverse cross auger transfers product from the live bottom hopper to a bottom fill auger assembly for filling bags carried on a bag elevator. Each of the four augers sequentially compresses and de-aerates the product, with backpressure being vented to the exterior of the assembly. The uniform density of the product within the final auger tube and discharge spout permits direct calculation of (and compensation for) the weight of the in-flight product, such that very precise topping of the suspended bag may be achieved. The operation of the infeed auger may be controlled by the level of product within the live bottom hopper, and the bottom fill auger revolution rate may similarly be interlocked with other functions of the assembly, such as the raising and lowering of the bag elevator, the intensity of the vibration of the bottom pan, or the speed of the transverse cross auger. Conventional bag hanging and handling devices may be utilized, or the assembly may be customized to a particular application.

BRIEF DESCRIPTION OF THE DRAWINGS

FIG. 2 is a side cross section view of the infeed auger, vibrating hopper assembly, and cross auger assembly taken through line 2—2 of FIG. 1; and FIG. 3 is a top cross section view of the vibrating hopper assembly taken through line 3—3 of FIG. 2.

DESCRIPTION OF THE PREFERRED EMBODIMENT

Figure 1:
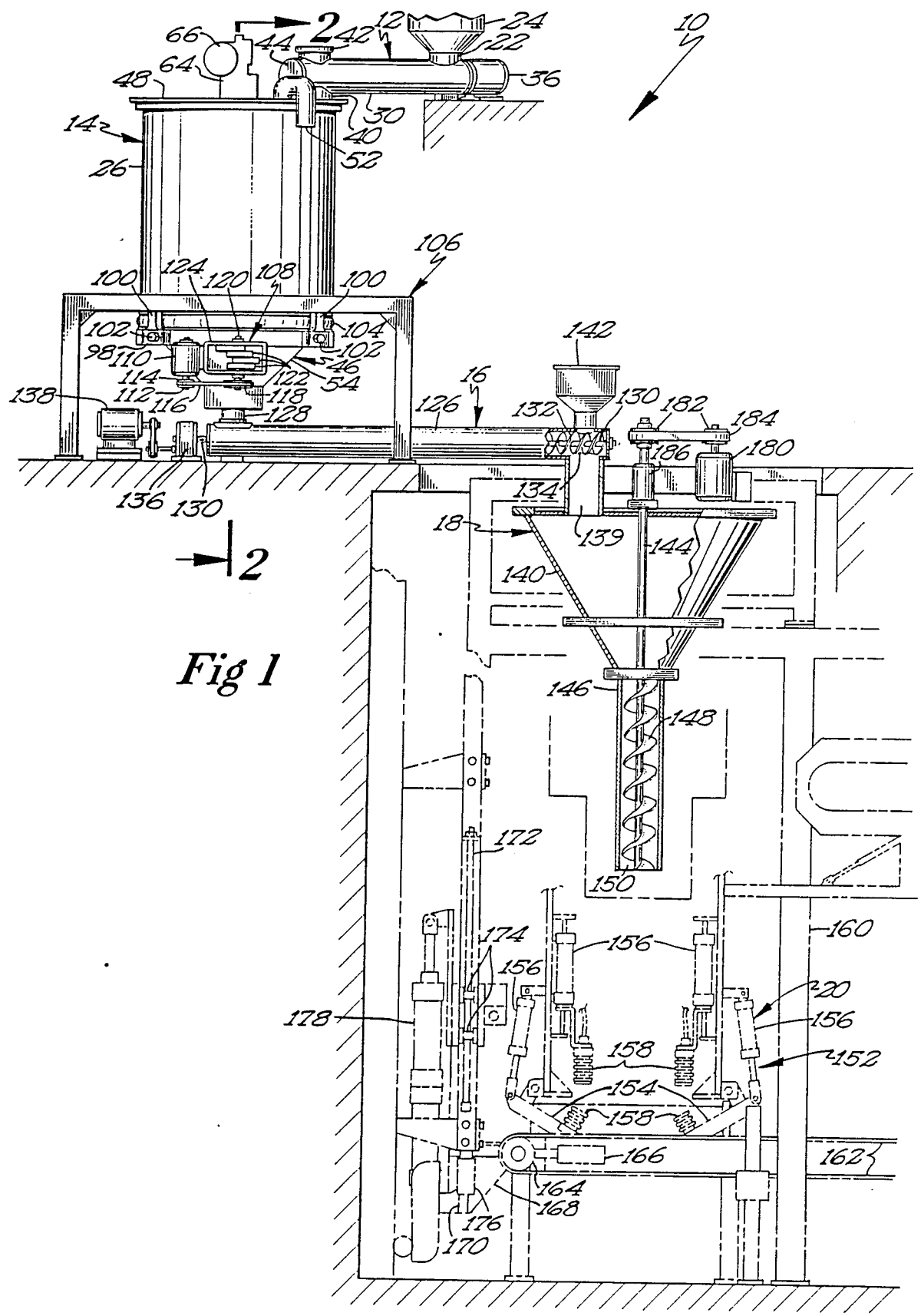
FIG. 1 is a front elevation view of the vibrating hopper and auger feed assembly of this invention.

The vibrating hopper and auger feed assembly of this invention is shown in FIGS. 1-3 and references generally therein by the numeral 10.

The vibrating hopper and auger feed assembly may be divided into five sub-stations: an infeed auger 12, a live bottom or vibrating hopper assembly 14, a cross auger assembly 16, a vertical bottom fill auger assembly 18, and a bag handling station 20.

Referring to FIGS. 1 and 2, the infeed auger 12 extends horizontally from a central outlet 22 at the bottom of the main product storage bin 24 to a position displaced slightly above the top bin 26 of the vibrating hopper assembly 14. Product from the main product storage bin 24 is transferred to or loaded into the top bin 26 by the infeed auger 12, the section of flighting 28 or blades of the infeed auger 12 mounted for rotation within the generally horizontal auger tube 30 to compress the product as it is conveyed through the auger tube 30. The auger tube 30 defines an aperture at the proximal end thereof which is connected to and communicates with the central outlet 22 of the main storage bin 24, and through which the product is received into the interior of the auger tube 30.

The product level 32 in the top bin 26 is monitored by a conventional bin level control 34 comprised of a flexible diaphragm and microswitch which is activated when sufficient pressure from the product is exerted on the diaphragm. The level control 34 is electively connected to a drive motor 36 such as a DC electric drive motor which propels the main drive shaft 38 of the infeed auger 12. As the product level 32 falls below the diaphragm of the level control 34, the drive motor 36 is engaged and product from the main product storage bin 24 is transferred by the infeed auger 12 to the position above the top bin 26. The compression of the product by the flighting 28 serves to de-aerate the product as it is conveyed within the auger tube 30, with back pressure from the excess air being released via a back pressure release valve or port 42 at the distal end 44 of the infeed auger tube 30 connected to the top thereof and communicating with the interior of the auger tube 30. The product falls downwardly a short distance into the top bin 26 through a vertical access tube 40 connected to and communicating with an outlet aperture defined in the bottom of the auger tube 30 adjacent to the distal end 44 thereof and the inlet port into the top bin 26, until the product level 32 rises and the level control 34 disengages the drive motor 36. The length of the vertical access tube 40 and the distance of the vertical drop into the top bin 26 are preferably minimized to prevent re-aeration of the product as it enters the top bin 26.

Referring to FIG. 2 and 3, the vibrating or live bottom hopper assembly 14 consists of the top bin 26 and bottom hopper 46. The top bin 26 has a generally cylindrical metal side wall defining an interior receptacle region having a volume of approximately fifty cubic feet, with a removable cover 48 attached to the top peripheral edge of the side wall by a plurality of bolt and bracket assemblies 50, and a substantially open bottom. The cover 48 further includes an air return 52 in the form of an inverted-U-shaped conduit communicating with the interior of the top bin 26, which permits air to enter and exit the top bin 26 through an aperture in the cover 48. The cover 48 also defines an inlet port which communicates with the vertical access tube 40 of the infeed auger 12. The bin level control 34 is mounted to the inner surface of the side wall of the top bin 26 facing toward the interior receptacle region of the top bin 26.

The bottom hopper 46 is comprised of a tapered conical pan 54 disposed substantially beneath the open bottom of the top bin 26 and communicating therewith such that product in the top bin 26 may pass downwardly into the bottom hopper 46, the bottom hopper 46 defining a central opening or bottom hopper outlet port communicating with the bore of a depending vertical outlet collar 56 which connects to the cross auger assembly 16. Extending vertically within the top bin 26 is an auger shaft 58, a section of flighting 60 or agitator blades being connected to the lower end of the auger shaft 58 and received within the conical pan 54 and bore of the outlet collar 56. The auger shaft 58 extends upwardly to a top end disposed above the cover 48 of the top bin 26 through an aperture 62 therein. Received within the aperture 62 and surrounding the top end of the auger shaft 58 is a generally cylindrical vent housing 64 which depends into the interior of the top bin 26 and provides means of venting air or other gasses through the cover 48 of the top bin 26 to the exterior region of the top bin 26. An auger drive motor 66 or drive means for rotating the auger shaft 58 such as a DC electric drive motor and differential 68 are mounted to the top of the vent housing 64, the differential 68 having a self-aligning bearing to couple the drive motor 66 to the top end of the auger shaft 58 to propel the auger shaft 58 and flighting 60 about a vertical axis of rotation. The top of the vent housing 64 defines a negative air vent 70 extending radially outward above the cover 48 of the top bin 26 and having an open distal end 72 communicating with the exterior region surrounding the top bin 26, and the bottom 74 of the vent housing 64 similarly defines a generally circular open bottom end 76 directed downwardly, and positioned generally above the product level 32 in the top bin 26.

Positioned within and connected to the bottom hopper 46 above the flighting 60 is an inverted pressure dome assembly 78 including an inverted truncated cone 80 having a generally circular bottom peripheral edge and defining a central aperture 82 substantially centered on the truncated cone 80 which receives a portion of the vertical vent tube 84 therein, the inverted pressure dome assembly 78 defining a generally enclosed area disposed beneath the inverted pressure dome assembly 84. The vertical vent tube 84 surrounds the auger shaft 58 and defines an air passage 86 therebetween, the air passage 86 and vertical vent tube 84 communicating with the aperture 82 and extending downwardly through and within the inverted cone 80 to the top edge of the flighting 60, and extending upwardly through the open bottom end 76 of the vent housing 64 to a top end positioned and received within the interior of the vent housing 64, thereby permitting air or gasses to be vented from the top end of the vent tube 84 to the exterior region of the top bin 26. The open bottom end 76 of the vent housing 64 is greater in diameter or size than the diameter of the vent tube 84 and displaced therefrom such that a concentric air space is formed between the vent housing 64 and vent tube 84, the air space permitting air or gasses from the top bin 26 to similarly be vented to the exterior region surrounding the top bin 26 through the vent housing 64, or air and gasses from the vent tube 84 to pass into the interior receptacle region of the top bin 26, to thereby permit the equalization of any pressure differential between the generally enclosed area beneath the pressure dome assembly 78, the vent tube 84, the interior receptacle region of the top bin 26, the vent housing 64, and the exterior region surrounding the top bin 26.

The inverted cone 80 is disposed above the conical pan 54, with the inverted cone 80 and vent 84 being supported by four spaced-apart support braces 88 which are fixedly attached to the inside wall of the conical pan 54 and the upper side and bottom peripheral edge of the inverted cone 80, the inverted cone 80 thereby being spaced apart from the bottom hopper 46 to permit product to flow therebetween due to the force of gravity. The flighting 60 of the auger shaft 58 extends substantially between the outlet port of the bottom hopper 46 upward to the generally enclosed area defined by the inverted cone 80, the flighting 60 preferably extending downward within the outlet collar 56.

Surrounding the bottom edge 90 of the side wall of the top bin 26 and securely attached thereto is a first or upper collar 92, three equilaterally spaced bracket members 94 being attached to and extending outwardly from the first collar 92. Similarly, extending outwardly from and fixedly attached to the top edge 96 of the conical pan 54 are three bracket members 98, each bracket member 98 of the conical pan 54 being positioned vertically beneath one of the bracket members 94 of the top bin 26. Extending between and pivotably connected to each pair of bracket members 94, 98 is a connecting rod 100. Each of the three connecting rods 100 having a straight central body and a pair of apertures spaced apart and aligned with apertures in the bracket members 94, 98, a bolt 102 extending through each aperture in the connecting rod 100 and the associated bracket members 94, 98 to fasten the connected rods 100 to the top bin 26 and bottom hopper 46.

Connected to and extending along the peripheral top edge 96 of the conical pan 54, and along the peripheral bottom edge 90 of the top bin 90, is a resilient connector 104 which forms a flexible air-tight seal between the top bin 26 and conical pan 54.

The top bin 26 is attached to and mounted within a triangular frame assembly 106, such that the bottom hopper 46 is suspended beneath the top bin 26 and supported by the connecting rods 100, thereby allowing the conical pan 54 to move slightly back and forth relative to the top bin 26 within the constraints of the resilient connector 104 and the connecting rods 104.

Mounted to the conical pan 54 of the bottom hopper 46 is a vibrator assembly 108 or vibration producing means comprising a drive motor 110 such as a DC electric drive motor having a drive shaft 112 and a first pulley wheel 114 connected by a belt 116 to a second pulley wheel 118 mounted on the lower end of a weight shaft 120, the weight shaft 120 carrying a plurality of offset counterweights 122 which each have a center of mass displaced radially from the axis of rotation of the weight shaft 120. The degree of vibration produced by the offset counterweights 122 as the counterweights 122 are rotated about the weight shaft 120 by the drive motor 110 may be selectively adjusted by altering the displacement of each of the counterweights 122 from the weight shaft 120 or by adjusting the speed of the drive motor 110.

The weight shaft 120 is rotatably mounted to and carried on a weight housing 124 which is fixedly attached to the conical pan 54 of the bottom hopper 46, so that the vibration induced by the counterweights 122 is transferred directly to the bottom hopper 46 and conical pan 54.

The product in the top bin 26 flows downwardly along the exterior of the vent tube 84, around the inverted cone 80 and between the support braces 88 and into the bottom hopper 46. The vibration of the bottom hopper 46 de-aerates the product, and the flighting 60 further compresses the product to remove more air as the product enters the outlet collar 56. The excess air removed from the product is released upwardly into the inverted cone 80 through the vent tube 84 and vent housing 64 and out through the open end 72 of the horizontal vent tube 70 above the cover 48 of the top bin 26.

Referring again to FIGS. 1 and 2, the outlet collar 56 of the conical pan 54 is connected to a first aperture in the top surface of the horizontal cross auger tube 126 by a generally cylindrical resilient tubular connector 128. Extending the length of the generally horizontal cross auger tube 126 and outwardly from one end thereof is an auger drive shaft 130 having a section of flighting 132 which extends along the length of the interior of the cross auger tube 126 between positions disposed on opposing sides of the first aperture and resilient tubular connector 128 and a second aperture or outlet port 134. The end of the auger shaft 130 which extends from the end of the cross auger tube 126 is connected to a differential or gear linkage 136, and in turn to a drive motor 138 such as a DC drive motor which propels the auger drive shaft 130 and flighting 132 about a generally horizontal axis of rotation. Product which falls or is pushed through the tubular connector 128 into the cross auger tube 126 is carried by the flighting 132 of the cross auger 16, which further compresses and de-aerates the product, until the product reaches the outlet port 134 in the bottom of the cross auger tube 126, and drops through the outlet port 134 and downwardly through a depending connecting tube 139 and into the bottom fill auger hopper 140 of the vertical bottom fill auger assembly 18, or a similar secondary hopper 140 in a unitary bag filling apparatus and handling station 20. Excess air forced from the product by the flighting 132 of the cross auger 16 is released via an air or gas pressure release outlet 142 communicating with the interior of the cross auger tube 126 proximate to the outlet port 134, and connected to the top of the cross auger tube 126 disposed above the outlet port 134 through which the product falls.

The vertical auger assembly 18 includes a generally vertical auger shaft 144 which extends downwardly through the open bottom fill auger hopper 140 and is received within the depending fill tube 146, the section of flighting or agitator blades 148 connected to the auger shaft 144 preferably extends substantially through the complete length of the fill tube 146 to the bottom end of the fill tube 146, and in some cases extends upwardly above the top of the fill tube 146 and into the interior of the bottom fill auger hopper 140. The flighting 148 conveys product from the bottom fill auger hopper 140 through the fill tube 146 to the terminal spout or dispensing neck 150 attached to or otherwise defined by the bottom end of the fill tube 146, further compressing and de-aerating the product and maintaining a generally uniform density of product as it is delivered or dispensed from the dispensing neck 150 into a bag (not shown).

In operation, a plurality of bags are stored in a bag magazine or otherwise disposed in position adjacent the bag handling station 20 such that an individual bag may be selectively and automatically grasped by a clam-jaw bag gripping mechanism 152 having a pivoting arm 154 controlled by double acting pneumatic cylinders 156 and having bag gripping members 158 which grip the gusset of the bag to be filled. The bag gripping mechanism 152 is preferably mounted for movement between an extended position adjacent to the terminal spout 150 of the fill tube 146 such that the bag is suspended from the bag gripping mechanism 152 and generally below the terminal spout 150, and gripped such that the terminal spout 150 and at least a portion of the fill tube 146 may be slidably received within the bag, and a second retracted position displaced from the extended position and adjacent to the bag magazine. The bag gripping mechanism 152 is mounted on a bag elevator assembly 159, the bag elevator assembly 159 being movable along a vertical path or track relative to the upright frame 160 so that the bag may be raised to a filling position whereat the fill tube 146 is received through the open top of the bag and the dispensing neck 150 at the bottom of the fill tube 146 is disposed substantially within the interior of the bag and positioned near or closely confronting the closed bottom of the bag, and the bag elevator assembly 159 may be controllably lowered to a filled position whereat the dispensing neck 150 at the bottom of the fill tube 146 is positioned near or closely adjacent to the open top of the bag as the bag suspended from the bag gripping mechanism 152 is filled with product.

The filled bag is lowered by the bag elevator assembly 158 until the bag contacts and rests upon a conveyor belt 162 disposed beneath the vertical bottom fill auger assembly 18. The conveyor belt preferably comprises a pair of spaced-apart tracks which are carried on a plurality of conveyor wheels 164, the tracks being spaced apart in the area directly beneath the vertical path of the bag as it is carried on the bag elevator assembly 159.

A bag tamping arm 166 is initially disposed between the tracks of the conveyor belt 162 and at or slightly beneath the level of the top of the conveyor belt 162 as shown in FIG. 1. The bag tamping arm 166 is connected to a bracket 168 and in turn to a carriage 170 which is mounted for vertical movement along a track 172, the carriage 170 having a set of grooved wheels 174 which engage the beveled outer side edges of the track 172 and carry the carriage 170 in a vertical path. The carriage 170 includes a tamping mechanism 176 such as a double acting power cylinder or other means capable of generating a reciprocating or vibrating movement to rapidly raise and lower the tamping arm 166. The carriage 170 and tamping arm 166 are mounted for generally vertical movement relative to the upright frame 160 along with the bag, the carriage 170 being raised and lowered by a dual acting power cylinder 178 or other suitably means for raising and lowering the carriage. The power cylinder 178 raises the carriage 170 such that the bag tamping arm 166 is positioned beneath the bag as the bag is in the raised position about to be filled. As the bag is filled with product and simultaneously lowered, the bag tamping arm 166 is also lowered at the same rate as the bag, the bag tamping arm 166 being vibrated in the vertical direction by the tamping mechanism 176 to repeatedly strike the bottom of the bag and settle the product within the bag. The bag tamping arm 166 will precede the bag downwardly until the bag is resting on the top of the conveyor belt 162, at which time the bag tamping arm 166 is disposed beneath the top of the conveyor belt 162 and the tracks thereof. The bag tamping arm 166 provides a single, more forceful strike to the bottom of the bag to level and redistribute the product, the conveyor belt 162 then carrying the bag to a sealing station.

The auger shaft 144 is powered by a drive motor 180 such as a DC electric motor which is coupled to the drive shaft 144 through a pair of pulley wheels 182 and a drive belt 184, with a stabilizer mounting 186 on the top of the bottom fill auger hopper 140 maintaining the auger shaft 144 in a generally vertical position and preventing misalignment or lateral movement of the auger shaft 144.

Because the proper linear alignment and tight fit of the auger blades 28, 60, 132, 148 within the respective auger tubes or collars 30, 56, 126, 146 is important to the operation of the vibrating hopper and auger feed assembly 10, the inner surfaces of the auger tubes or collars 30, 56, 126, 146 or the outer peripheral edges of the auger blades 28, 60, 132, 148 may be coated or lined with a layer of ultra high molecular weight high density polyethylene (UHMW HDPE) or a similar suitable covering. This is particularly applicable in the case of the auger blades 60 of the vibrating bottom hopper 46, wherein the auger shaft 58 will pivot out of vertical linear alignment as the bottom hopper 46 and outlet collar 56 vibrate laterally.

For optimal performance, the product is filled from the vertical bottom fill auger assembly 18 into the bag by weight, with a first quantity of product being filled in a bulk fill mode and a second quantity of product being filled in a topping or dribble fill mode. The product may be net weighed in the bag as it is suspended on the vertical bottom fill auger assembly 18, with the scale (not shown) being capable of weighing either the bag and product alone, or the entire clam-jaw bag gripping mechanism 152. By monitoring the number of revolutions of the auger shaft 144 over the filling period and measuring the weight of the product delivered in the bulk filling mode, an anticipated or in-flight weight of the product between the dispensing neck 150 may be calculated. This in-flight weight is equal to the ratio over time of the mass of product delivered per auger revolution times the number of auger revolutions. As such, the number of auger revolutions or partial revolutions necessary to complete the topping process may be calculated by subtracting the bulk fill weight (the total weight of product delivered during the bulk fill mode which equals the actual weight of product in the bag compensated by accounting for or adding the anticipated weight of the falling product) from the desired target weight, and dividing that quantity of product by the ratio of weight to auger revolutions. Because the density of the product may be maintained within very uniform parameters, the bulk filling for many products may be accomplished to within a few ounces or less without weighing during the bulk fill mode, and activating the scale only during the topping process.

The bag, bag gripping mechanism 152, and bag elevator assembly 159 may be electrically timed or mechanically interconnected with the auger shaft 144 and programmed to move downwardly in synchronized relation to the number or auger revolutions, such that a product is filled into the bag during the bulk fill mode, after the initial auger revolutions the bag will be lowered at a relatively uniform rate so that the distance between the top of the product in the bag and the dispensing neck 150 will be kept to a minimum, thereby also minimizing the amount of in-flight product and thereby increasing the accuracy of the bulk filling process and the product in-flight calculation, with the dispensing neck 150 or spout traversing the distance from the bottom of the bag to the top of the bag during a fill cycle. This may be accomplished using conventional sensors to produce signals corresponding to existing or preselected conditions, and a control means such as a microprocessor or other logic circuit to interpret those signals and responsively regulate the movement of the bag elevator assembly 158 and bag gripping mechanism 152, as well as the bag tamping mechanism 176, with the sensors and control means monitoring such conditions as the rate of any auger revolutions, the displacement of the bag elevator assembly 158, or the position of the bag gripping mechanism 176 using sensors of a type known to the art and producing electronic signals corresponding to predetermined values or conditions. Similarly, an operator may pre-program the distance the bag is initially lifted when being positioned relative to the dispensing neck 150 to accommodate different sizes and types of bags, as well as adjusting the timing or displacement of other components of the entire vibrating hopper and auger feed assembly 10.

While the preferred embodiment of the above vibrating hopper and auger feed assembly 10 has been described in detail above with reference to the attached drawing figures, it is understood that various changes and adaptations may be made in the vibrating hopper and auger feed assembly 10 without departing from the spirit and scope of the appended claims.

What is claimed is:

1. A vibrating hopper and auger feed assembly for use in de-aerating a product, said vibrating hopper and auger feed comprising:
    a frame assembly;
    a top bin connected to said frame assembly, said top bin defining an interior receptacle region to contain the product, an inlet port, and a generally open bottom;
    a bottom hopper, said bottom hopper being connected to and mounted substantially beneath said top bin in fluid communication therewith such that the product in said top bin may flow downwardly into said bottom hopper through said generally open bottom, said bottom hopper defining an outlet port;
    an inverted pressure dome, said pressure dome being connected to said bottom hopper and spaced apart generally therefrom such that product may flow between said pressure dome and said bottom hopper, said pressure dome defining a generally enclosed area disposed beneath said pressure dome, said pressure dome further defining an aperture extending therethrough;
    an auger shaft, said auger shaft being oriented in a generally vertical direction and extending upwardly from said outlet port of said bottom hopper through said aperture defined in said pressure dome and terminating in a top end thereof disposed above said pressure dome, said auger shaft including a section of flighting, said section of flighting being disposed beneath said pressure dome and extending substantially between said outlet port and said enclosed area disposed beneath said pressure dome;
    a vent tube, said vent tube surrounding said auger shaft and defining an air passage therebetween, said air passage of said vent tube communicating with said aperture defined in said pressure dome and with said enclosed area, said vent tube connected to and extending upwardly from said pressure dome in a generally vertical direction and terminating in a top end thereof;
    venting means for venting air from said top end of said vent tube to an exterior region surrounding said top bin;
    drive means for rotating said auger shaft, said drive means being connected to said auger shaft; and
    vibration producing means for vibrating said bottom hopper relative to said frame assembly,
    whereby the product is loaded into the top bin and flows downwardly around the inverted pressure dome and into the bottom hopper, the bottom hopper being vibrated by the vibration producing means, the product being compressed to remove excess gasses by the section of flighting as the auger shaft is rotated by the drive means, the product being expelled through the outlet port by said section of flighting with the excess gasses being vented upwardly through the pressure dome and vent tube.

2. The vibrating hopper and auger feed assembly of claim 1 wherein the top bin has a top and a cover, said cover extending substantially across said top of the top bin, said means for venting air from said top end of the vent tube comprising:
    a vent housing, said vent housing extending through the cover of the top bin and having an open distal end communicating with an exterior region surrounding the top bin and an open bottom end directed generally downwardly and receiving the top end of the vent tube therein.

3. The vibrating hopper and auger feed assembly of claim 2 wherein the open bottom end of the vent housing forms an air space between the vent housing and the vent tube, thereby permitting gasses from the top bin to be vented to the exterior region surrounding the top bin through the vent housing and gasses from the vent tube to pass into the interior receptacle region of top bin.

4. The vibrating hopper and auger feed assembly of claim 1 wherein the top bin has a side wall having a bottom edge and the bottom hopper has a peripheral top edge, said vibrating hopper and auger feed assembly further comprising:
    a resilient connector extending between the peripheral top edge of the bottom hopper and the bottom edge of the side wall of the top bin to form a flexible, air-tight seal therebetween.

5. The vibrating hopper and auger feed assembly of claim 1 wherein the product is to be transferred from a storage bin having an outlet to the inlet port of the top bin, said vibrating hopper and auger feed assembly further comprising:

an infeed auger, said infeed auger having an auger tube and an auger shaft with a section of flighting mounted for rotation within said auger tube, said auger tube having a proximal end positioned adjacent to the outlet of the storage bin and a distal end adjacent to the top bin, said auger tube defining an inlet aperture adjacent to the proximal end thereof communicating with the outlet of the storage bin such that product may be received through the inlet aperture into the auger tube, and said auger tube defining an outlet aperture adjacent to the distal end thereof such that product may be expelled into the top bin; and drive means for rotating said auger shaft of said infeed auger within said auger tube, said drive means being connected to said auger shaft, whereby the section of flighting of the auger shaft of the infeed auger compresses the product as it conveys the product within the auger tube from the outlet of the storage bin to the inlet port of the top bin.

6. The vibrating hopper and auger feed assembly of claim 5 wherein the top bin has a cover and the inlet port of the top bin is defined by said cover, and further wherein the distal end of the auger tube is disposed above said cover of the top bin adjacent to the inlet port thereof, said vibrating hopper and auger feed assembly further comprising:

a vertical access tube, said vertical access tube connected to and communicating with the outlet aperture defined in the auger tube adjacent to the distal end thereof and further connected to and communicating with the inlet port of the top bin.

7. The vibrating hopper and auger feed assembly of claim 5 further comprising:

a pressure release port for releasing gas from the auger tube, said pressure release port being defined by the auger tube adjacent to the distal end thereof.

8. The vibrating hopper and auger feed assembly of claim 1 wherein the vibration producing means comprises:

a weight shaft having an axis of rotation;

a counterweight having a center of mass, said counterweight being mounted to and carried on said weight shaft for rotary motion about said axis of rotation, said center of mass of said counterweight being displaced a distance from said axis of rotation;

means for rotating said counterweight about said axis of rotation of said weight shaft at a selected angular rate such that vibrations are produced by said counterweight; and housing means for connecting said weight shaft to said bottom hopper such that vibrations produced by said counterweight are transferred to the bottom hopper.

9. The vibrating hopper and auger feed assembly of claim 8 wherein the distance the counterweight is displaced from the axis of rotation may be adjusted.

10. The vibrating hopper and auger feed assembly of claim 8 wherein the angular rate may be selectively adjusted.

11. The vibrating hopper and auger feed assembly of claim 1 wherein the pressure dome has a generally truncated cone shape having a generally circular bottom peripheral edge, the aperture being substantially centered on said truncated cone shape of the pressure dome, at least a portion of the vent tube being received with the aperture.

12. The vibrating hopper and auger feed assembly of claim 11 further comprising:

a plurality of spaced-apart support braces, each of said plurality of spaced-apart support braces being fixedly attached to the bottom hopper and extending generally upwardly and connected to the pressure dome, adjacent the bottom peripheral edge thereof, the pressure dome thereby being spaced apart from the bottom hopper to define an annular space through which the product may flow.

13. The vibrating hopper and auger feed assembly of claim 1 for use in combination with a bag filling apparatus having a secondary hopper, said vibrating hopper and auger feed assembly further comprising:

a cross auger assembly, said cross auger assembly including a cross auger tube having an end and an opposing end and an auger shaft having a section of flighting mounted for rotation within said cross auger tube, said end of said cross auger tube being located adjacent to the outlet port of the bottom hopper and defining a first aperture communicating with the outlet port of the bottom hopper, said opposing end of said cross auger tube being located adjacent to the secondary hopper and defining a second aperture communicating with the secondary hopper, said section of flighting of said cross auger conveying the product from the first aperture adjacent the outlet port of the bottom hopper to the second aperture adjacent the secondary hopper, said cross auger further compressing and de-aerating the product as the product is conveyed within said cross auger tube.

14. The vibrating hopper and auger feed assembly of claim 13 further comprising:

a gas pressure release outlet for releasing excess gas from the interior of the cross auger tube, said gas pressure release outlet being connected to the cross auger tube proximate to the second aperture of the cross auger tube and communicating with the interior of the cross auger tube.

15. A vibrating hopper and auger feed assembly for use in de-aerating a product and filling said product into a bag, said vibrating hopper and auger feed assembly comprising:

a frame assembly;

a live bottom bin assembly, said live bottom bin assembly including a top bin connected to said frame assembly, said top bin defining an interior receptacle region to contain the product, an inlet port, and a generally open bottom, said live bottom bin assembly further including a bottom hopper, said bottom hopper being connected to and mounted substantially beneath said top bin in fluid communication therewith such that the product in said top bin may flow downwardly into said bottom hopper through said generally open bottom, said bottom hopper defining an outlet port, said live bottom bin assembly further including an inverted pressure dome, said pressure dome being connected to said bottom hopper and spaced apart generally therefrom such that product may flow between said pressure dome and said bottom hopper, said pressure dome defining a generally enclosed area disposed beneath said pressure dome, said pressure dome further defining an aperture extending therethrough, said live bottom bin assembly further including a live bottom bin auger shaft, said live bottom bin auger shaft being oriented in a generally vertical direction and extending upwardly from said outlet port of said bottom hopper through said aperture defined in said pressure dome and terminating in a top end thereof disposed above said pressure dome, said live bottom bin auger shaft including a section of flighting, said section of flighting being disposed beneath said pressure dome and extending substantially between said outlet port and said enclosed area disposed beneath said pressure dome, said live bottom bin assembly further including a vent tube, said vent tube surrounding said live bottom bin auger shaft and defining an air passage therebetween, said air passage of said vent tube communicating with said aperture defined in said pressure dome and with said enclosed area, said vent tube connected to and extending upwardly from said pressure dome in a generally vertical direction and terminating in a top end thereof;

a venting means for venting air from said top end of said vent tube;

a live bottom bin auger shaft drive means for rotating said live bottom bin auger shaft, said live bottom bin auger shaft drive means being connected to said live bottom bin auger shaft;

a cross auger assembly, said cross auger assembly including a cross auger tube having an end and an opposing end and an auger shaft having a section of flighting mounted for rotation within said cross auger tube, said end of said cross auger tube being located adjacent to said outlet port of said bottom hopper and defining a first aperture communicating with said outlet port of said bottom hopper, said opposing end of said cross auger tube defining a second aperture, said section of flighting of said cross auger conveying the product from said first aperture of said cross auger tube adjacent said outlet port of said bottom hopper to said second aperture of said cross auger tube and further compressing and de-aerating the product as the product is conveyed within said cross auger tube;

a cross auger shaft drive means for rotating said cross auger shaft within said cross auger tube, said cross auger shaft drive means being connected to said cross auger shaft;

a bottom fill auger assembly, said bottom fill auger assembly including a bottom fill auger hopper connected to and communicating with said second aperture of said cross auger tube such that the product conveyed to said second aperture of said cross auger tube will be dispensed into said bottom fill auger hopper, said bottom fill auger hopper having an open bottom and a depending fill tube connected to and communicating with said open bottom of said bottom fill auger hopper, said fill tube having a length and a bottom end and defining a spout adjacent said bottom end, said bottom fill auger assembly further including a generally vertical bottom fill auger shaft having a section of flighting, said bottom fill auger shaft extending downwardly within the bottom fill auger hopper and being received within the fill tube such that said section of flighting of said bottom fill auger shaft extends substantially through said length of said fill tube to said spout, said bottom fill auger assembly further compressing and de-aerating the product to maintain a generally uniform product density as the product is discharged from said spout; and a bottom fill auger shaft drive means for rotating said bottom fill auger shaft, said bottom fill auger shaft drive means being connected to said bottom fill auger shaft.

16. The hopper and auger feed assembly of claim 15 further comprising:

a bag handling station, said bag handling station including a bag gripping mechanism for gripping the bag, said bag gripping mechanism being movable between an extended position where the bag is suspended from said bag gripping mechanism and gripped such that said spout and at least a portion of said fill tube may be slidably received within the bag, and a retracted position displaced from said extended position.

17. The hopper and auger feed assembly of claim 16 wherein the bag has an open top and a closed bottom and an interior, said vibrating hopper and auger feed assembly further comprising:

a bag elevator assembly, said bag elevator assembly connected to said bag gripping mechanism and being movable along a vertical path relative to said frame assembly such that the bag may be raised to a filling position whereat the full tube is received through the open top of the bag and the spout at the bottom of the fill tube is disposed substantially within the interior of the bag and positioned near the closed bottom of the bag, and such that said bag elevator assembly may be controllably lowered to a filled position whereat the spout at the bottom of the fill tube is positioned near the open top of the bag as the bag suspended from the bag gripping mechanism is filled with product.

18. The hopper and auger feed assembly of claim 17 further comprising:

a bag tamping means for tamping the bottom of the bag suspended from the bag gripping mechanism, said tamping means being connected to and moveable with the bag elevator assembly.

19. The hopper and auger feed assembly of claim 18 further comprising:

a conveyor belt assembly for transporting the bag after the bag is filled with product, said conveyor belt being disposed beneath the bag gripping mechanism such that as the bag gripping mechanism is lowered to the filled position, the bottom of the bag will contact and rest on said conveyor belt assembly, said conveyor belt assembly including a pair of spaced apart tracks on which the bag may rest when lowered by the bag elevator assembly, said spaced apart tracks being disposed such that the bag tamping means is received between said tracks as the bag is lowered into contact with the conveyor belt assembly.

20. A bin and auger feed assembly for use in de-aerating a product and filling said product into a bag, said bin and auger feed assembly comprising:

a frame assembly;

a live bottom bin assembly connected to said frame assembly;

a cross auger assembly, said cross auger assembly connected to and communicating with said live bottom bin assembly;

a bottom fill auger assembly, said bottom fill auger assembly connected to and communicating with said cross auger assembly, said bottom fill auger assembly having an auger shaft with a section of flighting, a fill tube receiving said auger shaft with said section of flighting, and a spout, said auger shaft being mounted for rotation at a rate of revolution;

a bag handling station, said bag handling station being mounted to said frame assembly and including a bag gripping mechanism for gripping the bag such that said spout and at least a portion of said fill tube may be slidably received within the bag;

a bag elevator assembly, said bag elevator assembly connected to said bag gripping mechanism and being movable along a vertical path relative to said frame assembly such that the bag may be raised to a filling position whereat the fill tube is received through the open top of the bag and the spout at the bottom of the fill tube is disposed substantially within the interior of the bag and positioned near the closed bottom of the bag, and such that said bag elevator assembly may be controllably lowered to a filled position whereat the spout at the bottom of the fill tube is positioned near to the open top of the bag as the bag suspended from the bag gripping mechanism is filled with product, such that said bag elevator assembly may be moved along said vertical path in response to said rate of revolution of said auger shaft of said bottom fill auger assembly.

* * * * *